United States Patent
Huang

(10) Patent No.: US 7,117,288 B2
(45) Date of Patent: Oct. 3, 2006

(54) USB DYNAMIC SERVICE SWITCH FOR DUAL PROCESSOR ARCHITECTURE

(75) Inventor: Aiping Huang, Lake in the Hills, IL (US)

(73) Assignee: Motorola Inc., Schaumburg, IL (US)

( * ) Notice: Subject to any disclaimer, the term of this patent is extended or adjusted under 35 U.S.C. 154(b) by 342 days.

(21) Appl. No.: 10/692,620

(22) Filed: Oct. 24, 2003

(65) Prior Publication Data

US 2005/0091436 A1  Apr. 28, 2005

(51) Int. Cl.
G06F 13/20 (2006.01)
G06F 13/10 (2006.01)

(52) U.S. Cl. ...................... 710/313; 710/104
(58) Field of Classification Search ............. 710/305, 710/306, 313, 100, 300, 104, 8–10
See application file for complete search history.

(56) References Cited

U.S. PATENT DOCUMENTS

| | | | | |
|---|---|---|---|---|
| 6,131,125 | A * | 10/2000 | Rostoker et al. | 709/250 |
| 6,389,495 | B1 * | 5/2002 | Larky et al. | 710/8 |
| 6,560,665 | B1 * | 5/2003 | Resler et al. | 710/305 |
| 6,654,841 | B1 * | 11/2003 | Lin | 710/301 |
| 6,742,055 | B1 * | 5/2004 | Matsunaga | 710/10 |
| 6,832,273 | B1 * | 12/2004 | Ray et al. | 710/42 |
| 6,862,643 | B1 * | 3/2005 | Wu et al. | 710/302 |
| 2003/0027562 | A1 * | 2/2003 | Nishimura | 455/418 |
| 2004/0157638 | A1 * | 8/2004 | Moran et al. | 455/550.1 |
| 2004/0193744 | A1 * | 9/2004 | Paley et al. | 710/5 |
| 2005/0006483 | A1 * | 1/2005 | Fruhauf | 235/492 |
| 2005/0249143 | A1 * | 11/2005 | Tee et al. | 370/315 |

OTHER PUBLICATIONS

Universal Serial Bus Specification, Revision 2.0, Apr. 27, 2000, pp. 1-2 and 27-28.*

* cited by examiner

Primary Examiner—Rehana Perveen
Assistant Examiner—Trisha Vu
(74) Attorney, Agent, or Firm—Hisashi D. Watanabe

(57) ABSTRACT

USB bus enumeration and configuration switching in a dual-processor architected device can result in loss of the inter-processor communication link. In order to solve this problem, an apparatus, architecture and method for simplifying the Universal Serial Bus (USB) service enumeration between two processors in a dual-processor architecture device are provided. A USB host (102) is connected to a first processor (201) of the dual-processor device (100) via a USB cable (104). The first processor (201) begins to enumerate services to the connected host (102). When the host sends a set_configuration request (405) to the device (100), the device determines whether the first processor (201) and the second processor (203) have the same configuration sets. The first processor (201) sends a set_configuration request to the second processor (203) to setup the requested services in the second processor. If the configuration sets are different then the first processor (201) sends one or more set_interface requests to the second processor (203) in which each request turns on a specific service in response.

5 Claims, 4 Drawing Sheets

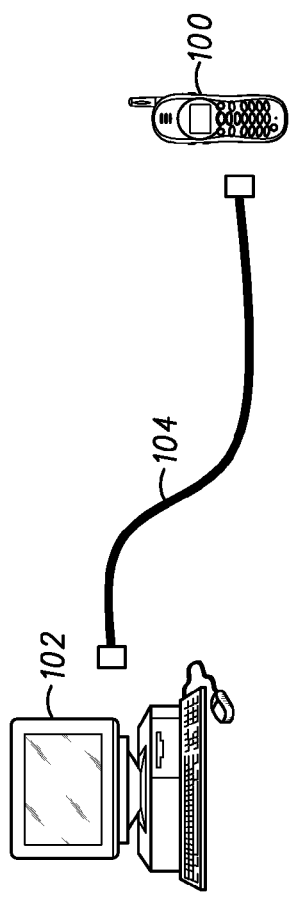
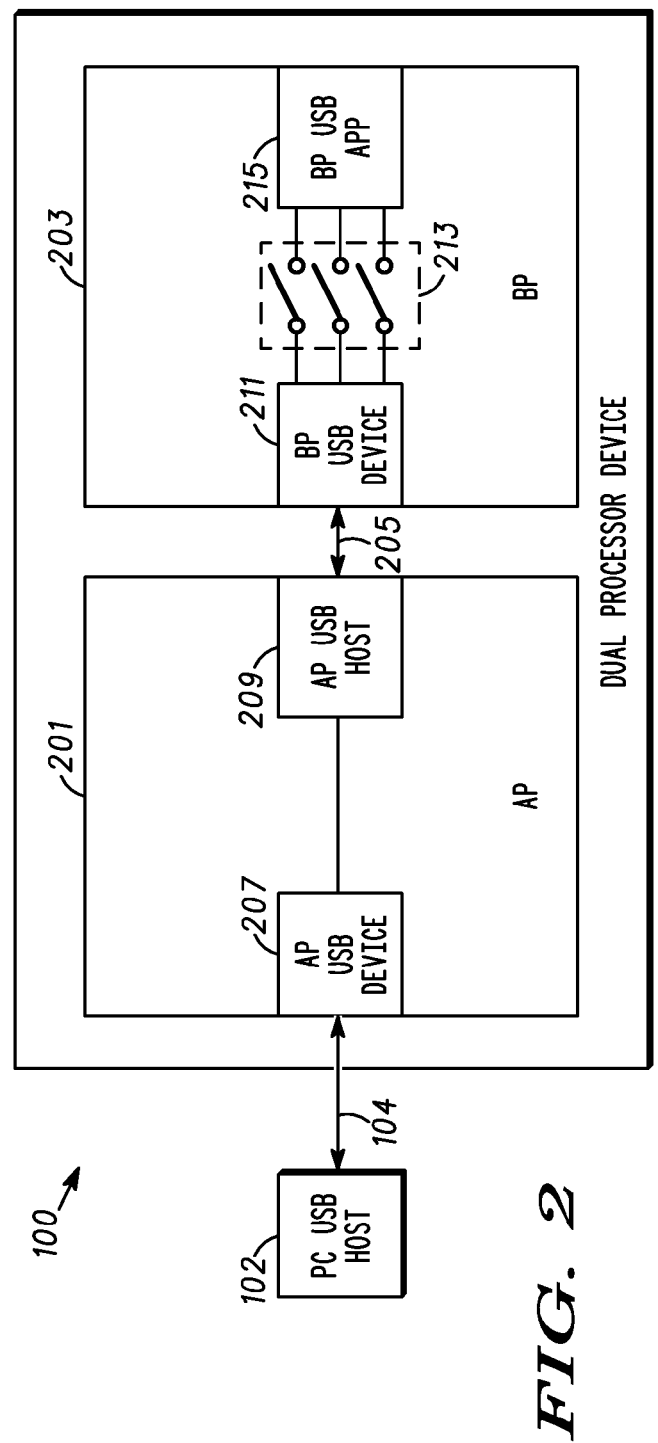

USB DYNAMIC SERVICE SWITCH FOR DUAL PROCESSOR ARCHITECTURE

FIELD OF THE INVENTION

The present invention relates generally to the Universal Serial Bus (USB) interface and more particularly to a USB dynamic service switch for use in USB devices employing dual processor architectures.

BACKGROUND OF THE INVENTION

In accordance with the USB specifications, a USB host follows the bus enumeration process when a USB device is attached to or removed from the bus, by being connected or disconnected, respectively to a hub. The USB host is informed that a device is connected and present by a measurement of the change in voltage levels between the cable connection point and ground.

Once the change in voltage state is detected and the port is allowed time to stabilize, the USB device is moved into a powered state, and the USB bus enumeration process begins. If the USB device is capable of many services then the enumeration process can be correspondingly very extensive.

If a device is designed to utilize dual processors, in which the processors communicate with each other using USB, then the dual processors will likewise follow the enumeration procedure upon power-up of the device or upon power-up of the processor acting as a USB device. A problem exists when switching configurations of the processors because the process can cause loss of the inter-processor communications link. The enumeration process can cause important service initialization information to be lost and overload of memory and the processor itself. As a result some services may not be usable when needed and mislead the applications.

Therefore, a need exists whereby the USB enumeration process can be limited at the USB layer between processors, in devices that employ dual processor architectures having a physical USB link.

BRIEF DESCRIPTION OF THE DRAWINGS

FIG. 1 is a block diagram of a dual-processor USB Device that can be connected to a USB Host using a USB cable in accordance with an embodiment of the present invention.

FIG. 2 is a block diagram of a dual-processor device architecture in accordance with an embodiment of the present invention.

DETAILED DESCRIPTION OF THE PREFERRED EMBODIMENTS

Figure 3:
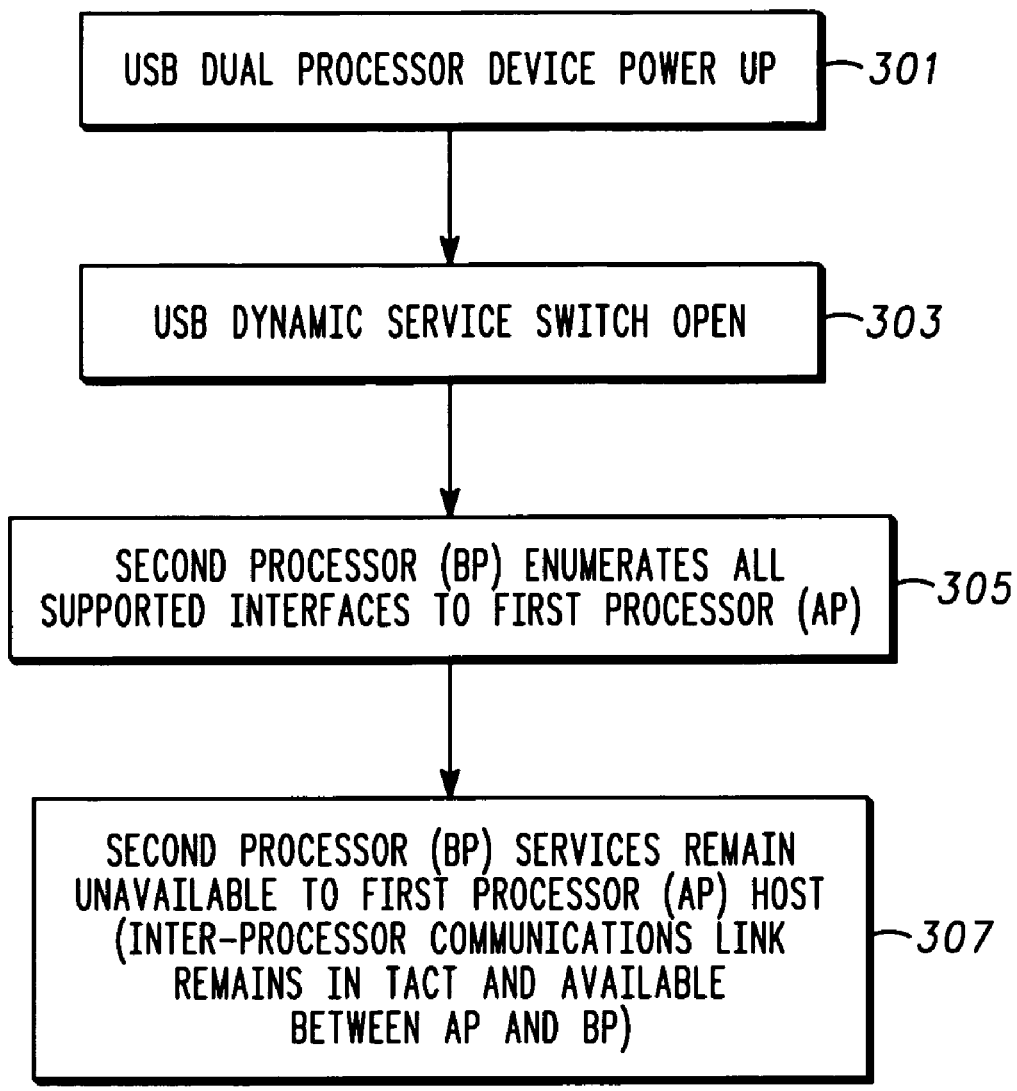
FIG. 3 is a flow diagram summarizing an operation of a USB Dynamic Service Switch during power-up of a dual-processor device in accordance with an embodiment of the present invention.

To address the above-mentioned need, an apparatus, architecture and method for simplifying the USB service enumeration between two processors in a dual-processor architecture device is provided herein.

A first aspect of the present invention is a USB device comprising; a first processor configured to provide a first set of services to an external USB host; and a second processor, connected to the first processor as a USB host, and configured to provide a second set of services to the external USB host. The second processor is configured to pass service data between the first processor and the external USB host.

A second aspect of the present invention is a USB device having two processors in which one processor has a logical service switch. The logical service switch is normally open such that the services of the first processor, other than the inter-processor communications link, are not available to the second processor during enumeration. The first processor services are made available to the second processor in response to a request.

A third aspect of the present invention is a method of USB enumeration by a dual-processor USB device and a host comprising; connecting the USB device to the host, receiving a set_configuration request from the host during enumeration, determining whether a first and second processor have the same configuration sets, and where either the second processor commands the first processor to set an identical configuration, or the second processor sends a set_interface request for specific first processor services.

Turning now to the drawings where like numerals designate like components, FIG. 1 is a block diagram of a dual-processor USB capable device 100, which can be connected to personal computer (PC) 102, using USB cable 104. Dual-processor USB capable device 100 may be a wireless device as illustrated in FIG. 1, however any device employing a dual-processor architecture and USB capability as further described herein would constitute an embodiment of, and in be accordance with, the present invention.

FIG. 2 is a block diagram illustrating further details of the internal architecture of dual-processor USB capable device 100 in accordance with an embodiment of the present invention. Dual-processor capable device 100 comprises, among other components that have not been shown for purposes of simplicity, a first processor "AP" 201, and a second processor "BP" 203.

Dual-processor USB capable device 100 is connected to PC 102 by USB cable 104. In FIG. 2, PC 102 functions as a USB Host with respect to dual-processor USB capable device 100. The interconnection between PC USB Host 102 and dual-processor USB capable device 100 is established via the first processor AP 201, such that AP 201 appears to PC USB Host 102 as AP USB Device 207. It is to be understood that in FIG. 2, AP USB Device 207, is representative of the USB connection port of device 100 and software executed by first processor AP 201, required for implementation of a USB device with respect to PC USB Host 102. Therefore, while AP USB Device 207 as shown, is primarily a representation of software code executed by first processor AP 201 as required for USB device implementation, the required hardware is also impliedly represented by FIG. 2.

When the USB cable 104 is connected between PC USB Host 102 and dual-processor USB capable device 100 via AP USB Device 207, the USB bus enumeration process will be initiated and proceed as required by the USB specifications and appear typical with respect to PC USB Host 102. However, the internal processes between first processor AP 201 and second processor BP 203 will be designed to limit the enumeration process between BP USB Device 211 and AP USB Host 209 to avoid problems of data overload, service initialization loss and resultant logical link disconnection between AP 201 and BP 203.

First processor AP 201, comprises the AP USB Device 207, which further comprises the USB hardware and software as briefly described above, and AP USB Host 209. In FIG. 2, AP USB Host 209 represents USB host software code executable on first processor 201 and a hardware connection, via connection 205, to second processor BP 203. Connection 205 is a USB connection between first processor AP 201 and second processor BP 203.

Second processor BP 203, comprises BP USB Device 211, which is connectively coupled to BP USB Applications 215 via USB Dynamic Service Switch 213. In FIG. 2, BP USB Device 211, is similar to AP USB Device 207 in that both hardware and software are represented. However, it is to be understood that the interface set supported in BP USB Device 211 is either identical to, or a subset of, the interface set in AP USB device 207. The BP USB Device 211 software is executable on second processor BP 203 such that second processor BP 203 appears as a USB Device to first processor AP 201 which functions as a USB Host via AP USB Host 209.

USB Dynamic Service Switch 213 is a logical switch implemented in software code executable on second processor BP 203. BP USB Applications 215 represents a service set, available from second processor BP 203, which can be ultimately made available to PC USB Host 102, via the connection path 205 between second processor BP 203, to first processor AP 201, and further from first processor 201 to PC USB Host 102 over connection path 104. Services of the BP USB Applications 215 service set are made available to PC USB Host 102 by closing a logical switch of USB Dynamic Service Switch 213 which comprises a multitude of logical switches in which each service, of BP USB Applications 215 has a corresponding associated logical switch.

The service set or BP USB applications 215 may be any conceivable services, but may be test related services for example; dial-up networking, two-way audio and audio control, main control processor data logging functions, digital signal processor data logging functions, digital signal processor debugging functions, test commands, network monitor functions, and inter-processor communication monitoring functions. Although embodiments of the present invention are particularly useful for test and debugging operations of dual-processor architecture devices, many other useful capabilities of USB capable dual-processor devices may be realized using the embodiments of the present invention. For example, multi-capability USB devices employing separate specialized processors for particular service sets may communicate with USB Hosts by making use of the benefits provided by the present invention.

FIG. 3 provides a summary of operation of USB Dynamic Service Switch 213. FIG. 3 represents an operation of dual-processor device 100 prior to connection of USB cable 104. In FIG. 3 dual processor device 100 is initially powered off. In block 301, the device is powered on. As illustrated in block 303, Dynamic Service Switch 213 remains open such that the service set represented by BP USB Applications 215 is not available to AP USB Host 209. However, upon device 100 power-up, AP USB Host 209 detects the state change by BP USB Device 211 because of physical connection 205, and USB bus enumeration occurs in block 305. Although the enumeration of block 305 appears to AP USB Host 209 as a typical USB bus enumeration, the services of BP USB applications 215 are not available because of Dynamic Service Switch 213 which is in an open state. More particularly, from the BP USB Application 215 point of view, USB link 205 is not connected and no USB service is available. Important to note is that inter-processor communication services are not effected by Dynamic Service Switch 213 and remain in full operation between the two processors.

Figure 4:
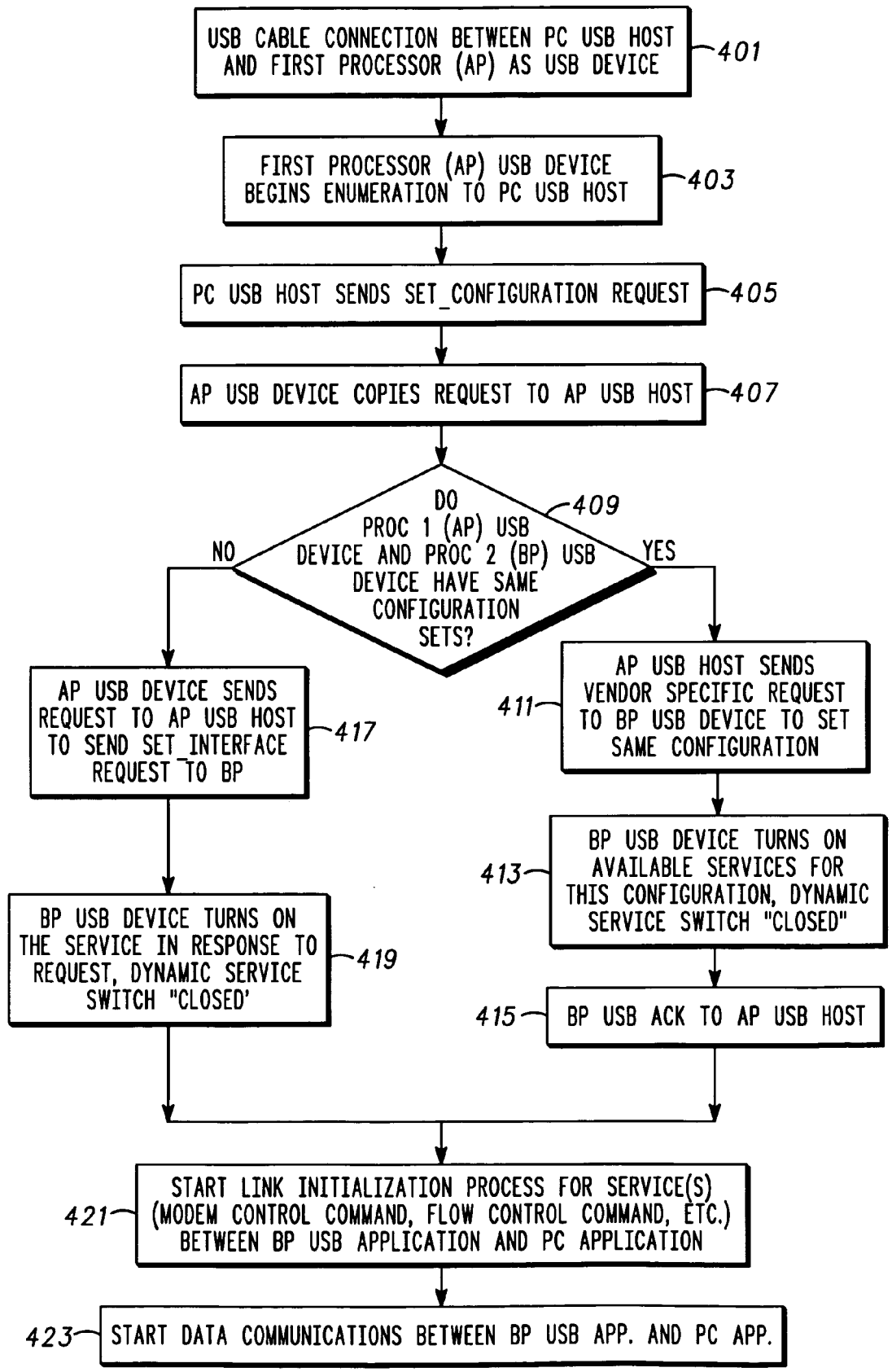
FIG. 4 is a flow diagram illustrating the USB enumeration process with respect to the internal process of a dual-processor device in accordance with an embodiment of the present invention.

Further details of operation of Dual-processor device 100 with respect to Dynamic Service Switch 213 are provided in FIG. 4. In FIG. 4, block 401, a USB cable is connected between a USB host and Dual-processor device 100 such as cable 104 connected between PC USB Host 102 and AP USB Device 207.

In block 403, first processor AP 201 begins USB bus enumeration to PC USB Host 102. During the enumeration process, PC USB Host 102 sends a "set_configuration" request message to AP USB Device 207 as illustrated by block 405. In block 407, AP USB Device 207 copies the set_configuration request to AP USB Host 209.

The next actions taken by the first processor 201 depend upon the configuration sets of the first processor 201 and the second processor 203, and whether the configuration sets are identical or different as illustrated by decision block 409.

If the configuration sets are identical, then the process proceeds as illustrated by block 411. In block 411, AP USB Host 209 sends a vendor specific set_configuration request in which the endpoints within the interfaces have vendor-specific definitions as is permissible within the USB Device Framework.

In block 413, BP USB Device 211 responds by placing the Dynamic Service Switch 213 in a "closed" state for the BP USB application 215 services corresponding to the specifically requested configuration. In block 415, the BP USB Device 211 will acknowledge the set_configuration request to the AP USB Host 209, and the AP USB Device 207 will respond to the set_configuration request by the PC USB Host 102 thereby completing the USB bus enumeration for Dual-processor device 100.

In block 421, link initialization processes, such as modem control commands, flow control commands, etc., between the BP USB application 215 service or services and a PC USB Host application 102 can begin. Lastly, in block 423, data communications between the second processor BP 203, BP USB applications 215, and PC Host 102 applications can begin.

Returning to decision block 409, if the configuration sets of first processor 201 and second processor 203 are different, then the process proceeds as illustrated by block 417. In block 417, AP USB device 207 sends a "set_interface" request to AP USB Host 209, and AP USB Host 209 sends a vendor specific set_interface request to BP USB device 211. In block 419, BP USB device responds by placing the Dynamic Service Switch 213 in a "closed" state for the BP USB application 215 services corresponding to the set_interface requests. Each set_interface request will cause the Dynamic Service Switch 213 to close one logical switch, such that if PC USB Host 102 requires multiple services of second processor BP 203 then a set_interface request will be sent for each desired service, which in turn will cause the appropriate logical switch of Dyanamic Service Switch 213 to close for its respective service.

The process may then proceed to block 421, link initialization processes, and block 423, data communications between the second processor BP 203, BP USB applications 215 and PC USB Host 102 applications as described above. Important to note is that in embodiments of the present invention, the AP USB Device 207 and AP USB Host 209 do not have to process commands with respect the BP USB application 215 services. Rather, the AP USB Device 207 and AP USB Host 209 act only to copy and pass data, bi-directionally, between the PC USB Host 102 applications and the second processor 203.

It is further important to note that, because the total number of services supported by BP USB applications 215 are never made fully available to AP USB Host 209 during USB bus enumeration, because of the action of Dynamic Service Switch 213, the second processor 203 is protected from overloading, loss of service initialization information and loss of its logical link to the first processor 201.

Figure 5:
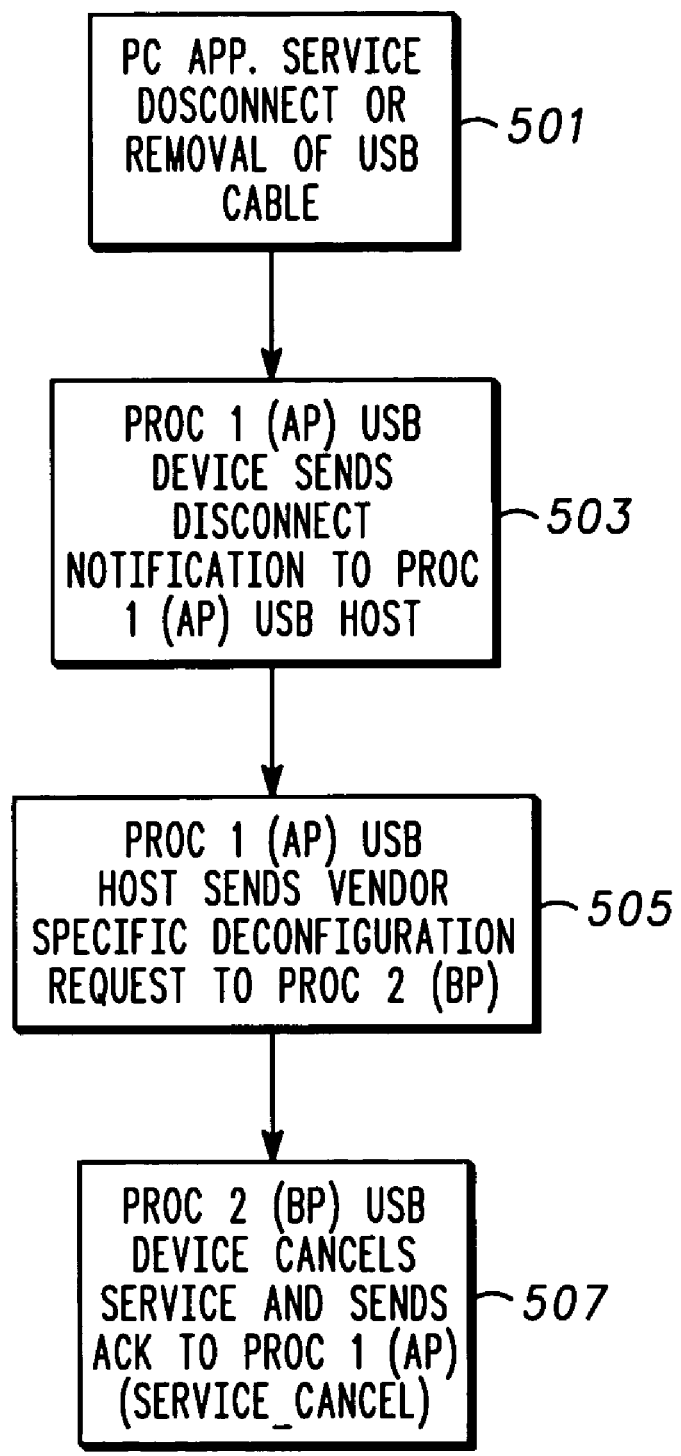
FIG. 5 is a flow diagram illustrating a process occurring at USB cable disconnect or USB service disconnect, in accordance with an embodiment of the present invention.

FIG. 5 illustrates the process that occurs upon disconnection of the USB cable or upon a USB service disconnect in accordance with an embodiment of the present invention. In block 501, an application of USB PC Host 102, initiates a service disconnect, or the USB cable 104 is disconnected. In block 503, upon the service disconnect notification, AP USB device 207 sends a disconnect notification to AP USB Host 209.

In block 505, AP USB Host 209 sends a vendor specific de-configuration request message to BP USB device 211. In block 507, BP USB device 211 will send a service_cancel message effectively closing Dynamic Service Switch 213 for the disconnected service or services and provide an acknowledgment to AP USB Host 209.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A Universal Serial Bus device comprising:
   a first processor configured as a Universal Serial Bus device to provide a first set of services to an external host; and
   a second processor, coupled to said first processor as a Universal Serial Bus host and coupled to a Universal Serial Bus device connector suitable for connection to said external host, configured to provide a second set of services to said external host, and configured to pass service data bi-directionally between said first processor and said external host for said first set of services,
   wherein said first processor is further configured to have a plurality of normally open logical service switches, wherein said first set of services are unavailable to said second processor during bus enumeration from said first processor to said second processor while inter-processor communication services continue between said first and second processors.

2. The Universal Serial Bus device of claim 1, wherein:
   wherein at least one of said plurality of normally open logical service switches will close with respect to at least one of said first set of services in response to a request by said second processor.

3. A Universal Serial Bus device comprising:
   a first processor configured as a Universal Serial Bus device to provide a first set of services to an external host; and
   a second processor, coupled to said first processor as a Universal Serial Bus host and coupled to a Universal Serial Bus device connector suitable for connection to said external host, configured to provide a second set of services to said external host, and configured to pass service data bi-directionally between said first processor and said external host for said first set of services,
   wherein said second processor is further configured to respond to a set configuration request from said external host by comparing configuration sets of said first processor and said second processor, transmitting a set interface request to said first processor if said configuration sets are different, and transmitting a configuration request to said first processor if said configuration sets are identical.

4. A method of Universal Serial Bus enumeration by a Universal Serial Bus device having a first processor and a second processor comprising:
   connecting a host to said Universal Serial Bus device;
   receiving, from said host, a set configuration request;
   determining that said first processor and said second processor have the same configuration sets;
   transmitting, by said second processor, a set configuration request to said first processor for the configuration of said second processor; and
   closing, by said first processor, a logical switch to connect services to said second processor in response to said configuration request.

5. A method of Universal Serial Bus enumeration by a Universal Serial Bus device having a first processor and a second processor comprising:
   connecting a host to said Universal Serial Bus device;
   receiving from said host a set configuration request;
   determining that said first processor and said second processor have different configuration sets;
   transmitting by said second processor at least one set interface request to said first processor; and
   closing, by said first processor, at least one logical switch to connect at least one service to said second processor in response to said at least one set interface request.

* * * * *